(12) United States Patent
Kawasumi et al.

(10) Patent No.: US 6,641,944 B2
(45) Date of Patent: Nov. 4, 2003

(54) FUEL CELL DRIVE SYSTEM

(75) Inventors: Emi Kawasumi, Yokohama (JP); Yasukazu Iwasaki, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 190 days.

(21) Appl. No.: 09/973,985

(22) Filed: Oct. 11, 2001

(65) Prior Publication Data

US 2002/0045078 A1 Apr. 18, 2002

(30) Foreign Application Priority Data

Oct. 12, 2000 (JP) ........................................ 2000-312082

(51) Int. Cl.[7] .............................. H01M 8/04; H01M 8/18
(52) U.S. Cl. ............................. 429/19; 429/24; 429/20
(58) Field of Search ................................. 429/19, 20, 22, 429/24, 26, 13

(56) References Cited

U.S. PATENT DOCUMENTS 6,296,959 B2 * 10/2001 Takabe ..................... 429/26
6,306,531 B1 * 10/2001 Clingerman ............... 429/19
6,576,360 B2 * 6/2003 Kawasumi ................. 429/22

FOREIGN PATENT DOCUMENTS

EP  1198020 A2 *  4/2002  ............ H01M/8/06
JP  10-64571     3/1998

* cited by examiner

Primary Examiner—Mark Ruthkosky
(74) Attorney, Agent, or Firm—Foley & Lardner

(57) ABSTRACT

High temperature reducing gas is supplied to a reforming catalyst (51) of a reformer (13) and a CO removal catalyst (52) of a CO removal device (15) from a start-up combustor (11). By supplying the high temperature reducing gas from the start-up combustor (11), there is no need to provide an additional device for supplying reducing gas, and the heat required for the reaction may be supplied simultaneously.

12 Claims, 10 Drawing Sheets

FUEL CELL DRIVE SYSTEM

FIELD OF THE INVENTION

This invention relates to a fuel cell drive system which supplies reformate gas containing hydrogen to a fuel cell.

BACKGROUND OF THE INVENTION

In a fuel cell drive system disclosed in JP-A-H10-64571 published by the Japanese Patent Office in 1998, oxidation of a CO removal catalyst is avoided by filling a CO removal device with hydrogen when the system has stopped running. When the system restarts, the CO removal catalyst oxidized by air is reduced using the hydrogen gas.

SUMMARY OF THE INVENTION

However, in the above system, the CO removal device is filled with hydrogen to avoid oxidation of the catalyst when the system has stopped running, so a hydrogen filling/supply device must be differently set with the driving device, and it makes the system complicated.

In the case of catalyst reductive reaction using the filled hydrogen gas on startup, system needs the device to supply the heat required for the reaction. Further, because reduction is performed when the system restarts, it is impossible to reactivate the catalyst until the system is stopped running even if the catalyst oxidizes and deteriorates during running.

Therefore, it is an object of this invention to reduce the catalyst of a fuel cell drive system by means of a simple construction, and to make the drive system work efficiently.

In order to achieve above object, this invention provides a drive system for a fuel cell, composing a reformer which has a catalyst and generates gas supplied to the fuel cell, a start-up combustor which is provided upstream of the reformer and supplied with fuel and air to perform combustion and a controller functioning to generate high temperature reducing gas in the start-up combustor by burning the supplied fuel and air, and supply the high temperature reducing gas to the catalyst reaction part, and reduce the catalyst in the reformer.

The details as well as other features and advantages of this invention are set forth in the remainder of the specification and are shown in the accompanying drawings.

DESCRIPTION OF THE PREFERRED EMBODIMENTS

Figure 1:
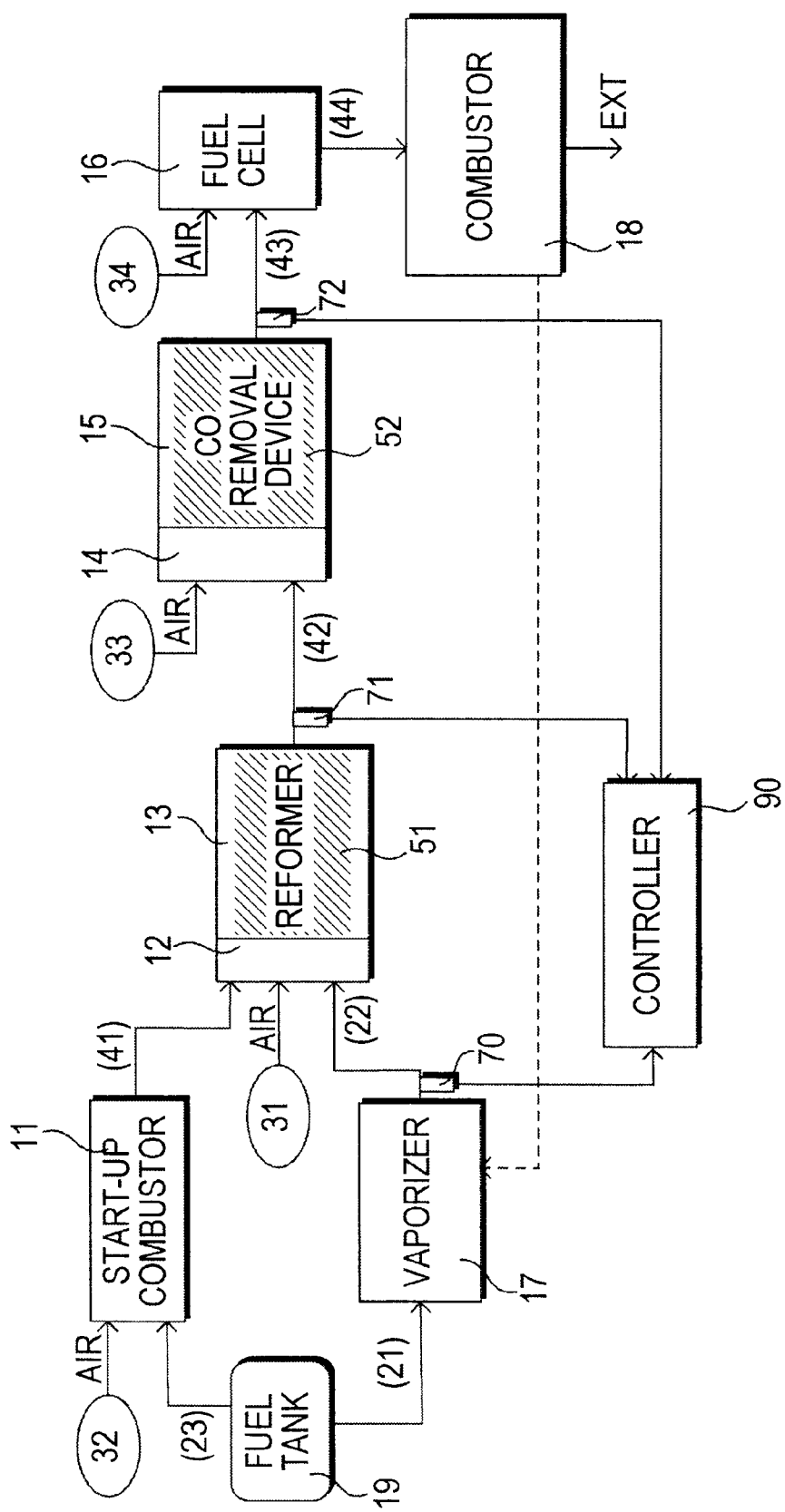
FIG. 1 is a block diagram of the fuel cell drive system according to this invention.

Referring to FIG. 1 of the drawings, a fuel cell drive system according to this invention composes a vaporizer 17 which vaporizes fuel 21 having, for example, methanol as its main component supplied from a fuel tank 19, a first mixer 12 which mixes fuel 22 vaporized in the vaporizer 17 with air 31, a reformer 13 which reforms the mixed gas from the first mixer 12, a second mixer 14 which mixes reformate gas 42 generated in the reformer 13 with air 33, and a CO removal device 15 which reduces/removes carbon monoxide in the gas from the second mixer 14 to the concentration permitted by a fuel cell 16.

The reformer 13 generates hydrogen from methanol by partial oxidation reforming, but hydrogen may also be generated by steam reforming or by autothermal reforming that partial oxidation reforming and steam reforming are both performed. The CO removal device 15 converts CO into $CO_2$ by selective oxidation, but may convert CO into $CO_2$ also by a shift reaction.

The reformer 13 has a reforming catalyst 51, and the CO removal device 15 has a CO removal catalyst 52. The reaction part of catalyst on the system means the reforming catalyst 51 and the CO removal catalyst 52.

The fuel cell 16 which generates power by reacting hydrogen-rich reformate gas 43 supplied from the CO removal device 15 and air 34, is set downstream of the CO removal device 15. Also, a combustor 18 is set downstream of the fuel cell 16. Exhaust gas 44 discharged from the fuel cell 16 is completely burnt in the combustor 18, and discharged to the atmosphere.

A start-up combustor 11 which burns fuel 23 supplied from a fuel tank 19 is connected at the inlet of the first mixer 12. The fuel 23 and air 32 are supplied to the start-up combustor 11, and reducing gas 41 is produced by burning the supplied fuel 23 and air 32. An ignition device such as a glow plug or the like, not shown, for igniting the fuel 23, is inserted in the start-up combustor 11.

In the vaporizer 17, the fuel 21 is vaporized using the heat of the combustor 18. Although not shown, the drive system has a fuel feed system which supplies the fuel adjusted in the fixed pressure via a fuel pump and an air feed system which supplies air by the air in the fixed pressure via a compressor.

Figure 2:
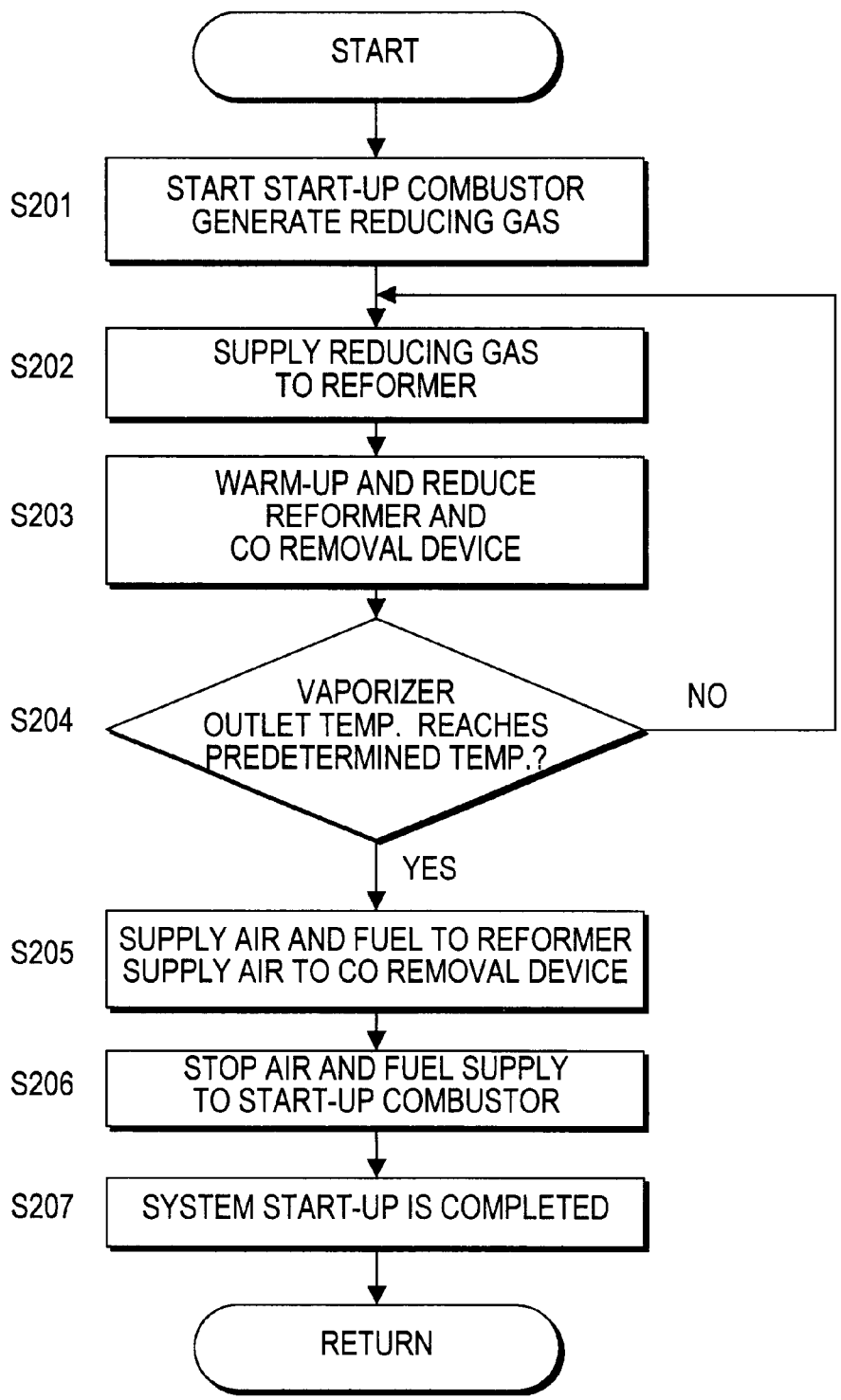
FIG. 2 is a flowchart showing the details of a drive system startup process.

Next, the startup process in this drive system will be described referring to FIG. 2.

In the following description and in the figures, the symbol "S" represents processing steps periodically or when predetermined conditions are satisfied performed by an interrupt process by a control system centered on a controller 90. The controller 90 comprises one or more microprocessors, a memory, and an input/output interface.

First, the fuel 23 and air 32 are supplied from the fuel tank 19 to the start-up combustor 11, and they are ignited there. After that the gas 41 is produced by operation of the start-up combustor 11 (S201). At this time, the temperature and composition of the gas 41 varies due to the amounts and mixing ratio of the fuel 23 and air 32. Because the gas 41 contains CO and hydrogen, it has a reducing action. In addition, it has a sufficient heat for reduction, because the temperature of the gas 41 rises for the exothermic reaction by the combustion in the start-up combustor 11.

Thus, the gas 41 is supplied to the reformer 13 and CO removal device 15 (S202), and the reforming catalyst 51 in the reformer 13 and CO removal catalyst 52 in the CO removal device 15 are reduced (S203). At this time, due to the heat that the gas 41 has, the reformer 13 and CO removal device 15 are warmed-up, and the temperature of the combustor 18 also rises.

In the vaporizer 17, the fuel 21 supplied from the fuel tank 19 is vaporized using the heat produced in the combustor 18, and fuel vapor 22 is produced.

When the outlet temperature of the vaporizer 17 detected by a temperature sensor 70 reaches a predetermined temperature (S204), the fuel vapor 22 is supplied to the reformer 13 via the first mixer 12. Also, the air 31 is supplied to the reformer 13 via the first mixer 12, and the air 33 is supplied to the CO removal device 15 via the second mixer 14 (S205). At the same time, the supply of the gas 41 is stopped because the supply of the fuel 23 and air 32 stop supplying to the start-up combustor 11 (S206). Only the fuel vapor 22 from the vaporizer 17 and air 31 is supplied to the reformer 13 (actually, supplied to the mixer 12), and only the reformate gas 42 and air 33 are supplied to the CO removal device 15 (actually, supplied to the mixer 14).

After performing the above process, it is determined that startup of the drive system is complete, and the routine shifts to steady-state operation (S207).

After beginning startup, the time is needed until the outlet temperature of the vaporizer 17 reaches the predetermined temperature. So by reducing the reforming catalyst 51 and CO removal catalyst 52 with the gas 41 supplied from the start-up combustor 11 during this interval, catalyst can be reactivated until startup of vaporizer 17 is complete.

Figure 3:
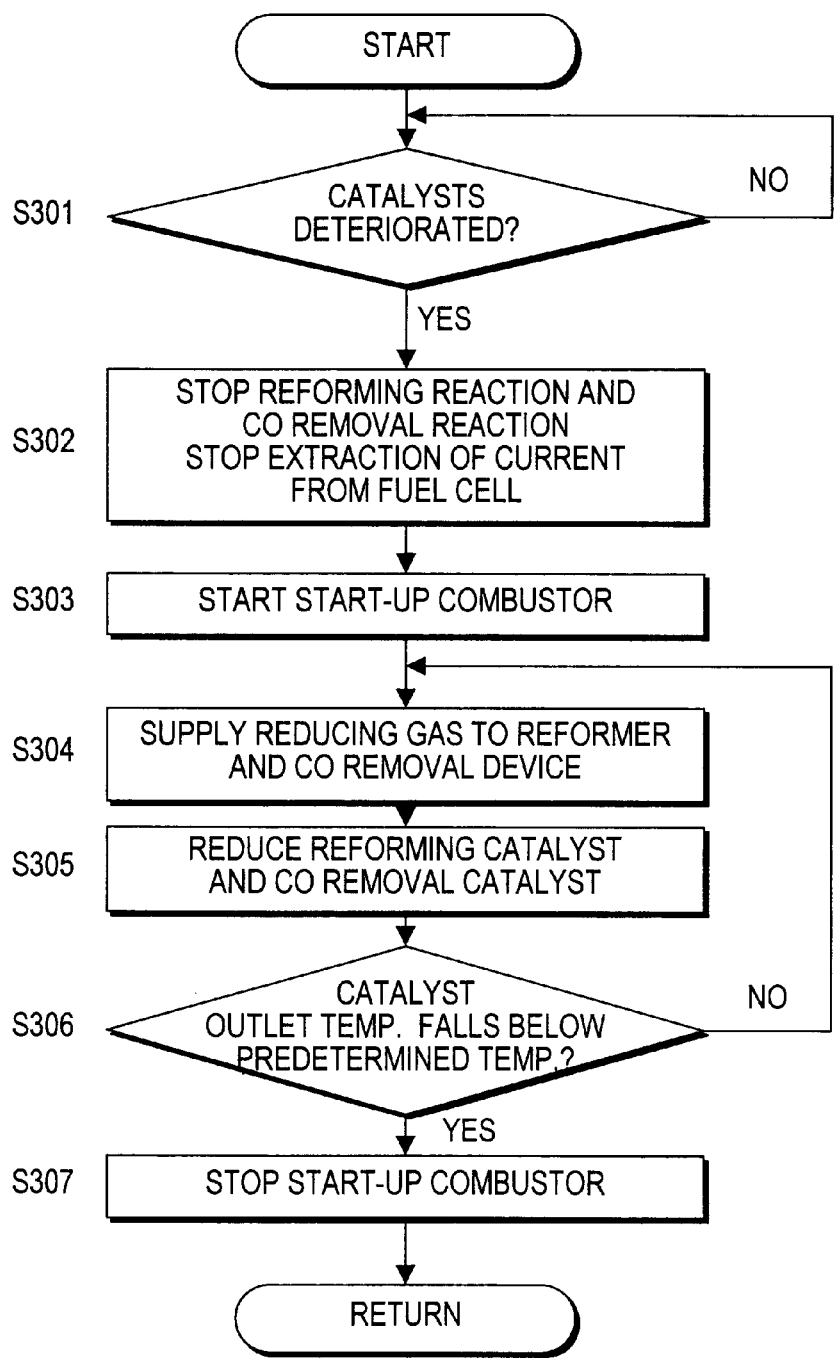
FIG. 3 is a flowchart showing the details of a catalyst reactivation process during running of the drive system.

Next, refer to FIG. 3, FIG. 3 describes how deterioration of the catalyst due to oxidation is determined and catalyst is reactivated while the drive system runs on steady-state operation.

Figure 4:
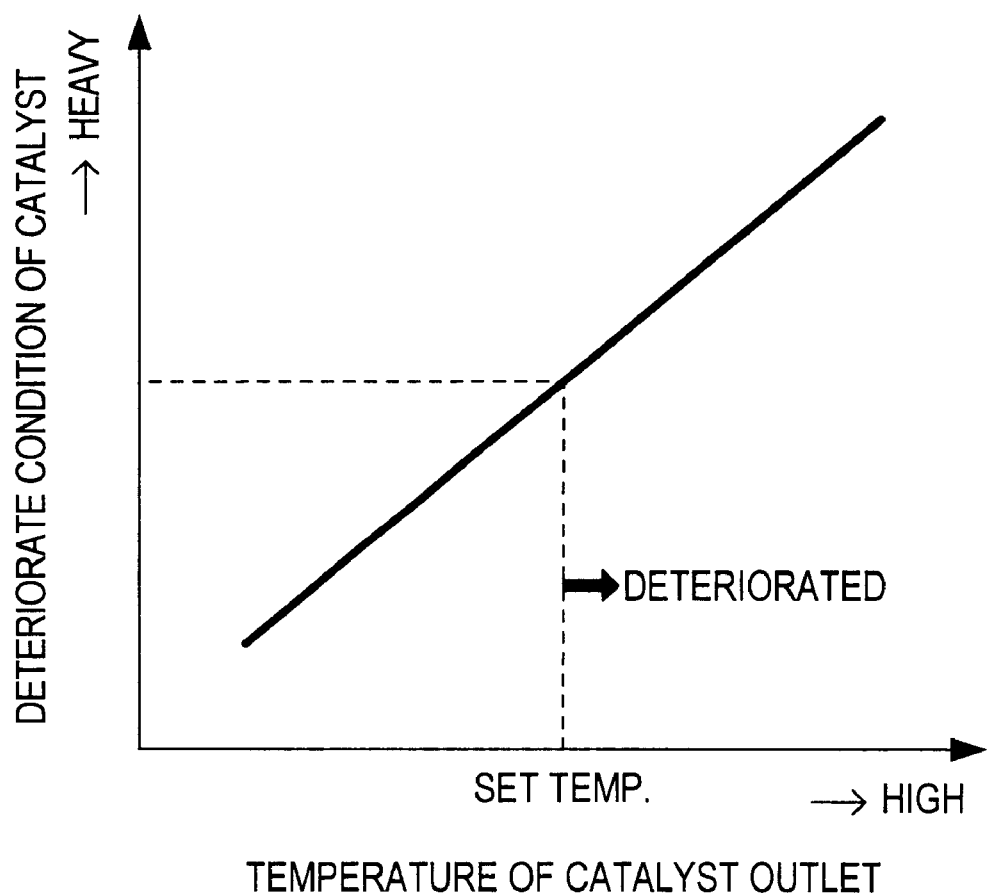
FIG. 4 is a diagram showing a relation between a temperature of catalyst outlet and a deteriorate condition of catalyst.

Firstly, the catalyst deterioration is determined (S301). For example, when the reforming catalyst 51 and CO removal catalyst 52 deteriorate, and the outlet temperatures of the reformer 13 and CO removal device 15 exceed a predetermined temperature as shown in FIG. 4, it is determined that the catalyst has deteriorated.

If it is determined that the catalysts 51, 52 have deteriorated, the reforming reaction and CO removal reaction are stopped, and extraction of current from the fuel cell 16 is also stopped (S301, S302). The start-up combustor 11 is operated by the same way as startup, the reforming catalyst 51 and CO removal catalyst 52 are reduced by supplying the gas 41 to the reformer 13 and CO removal device 15, and these catalysts 51, 52 are thereby reactivated (S303–S305). The reforming catalyst 51 and CO removal catalyst 52 are thereby effectively reactivated to their initial state.

Figure 5:
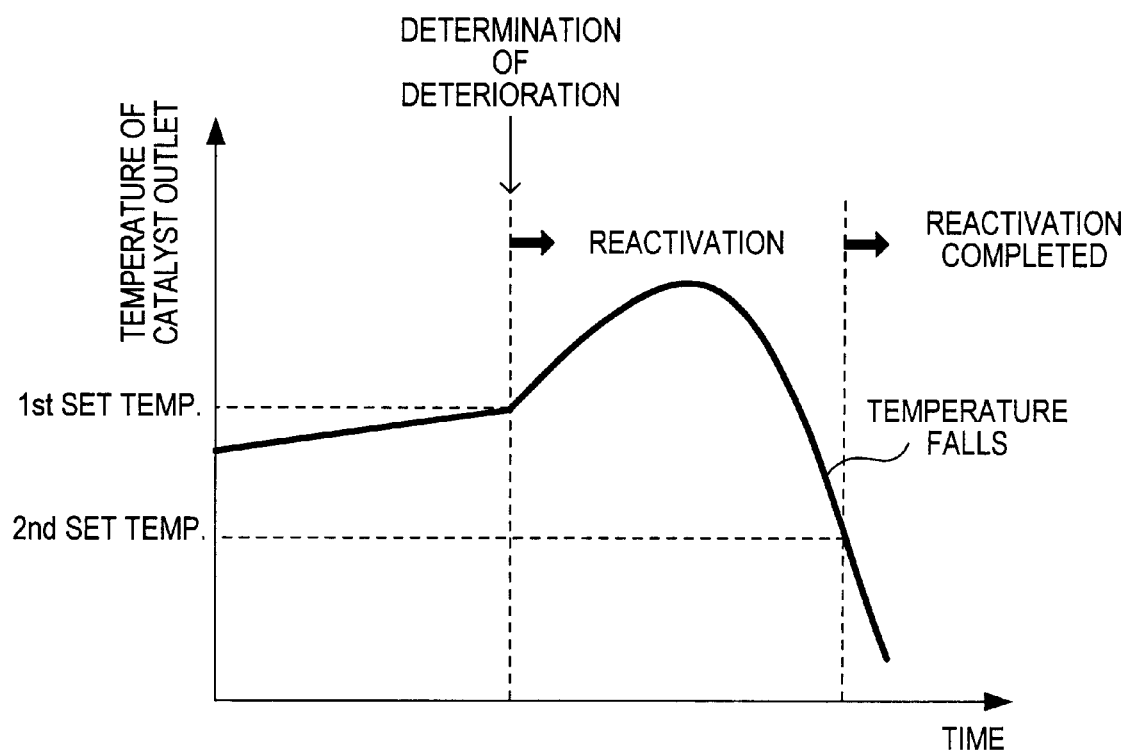
FIG. 5 is a-diagram showing a variation of the temperature of catalyst outlet when the catalyst is reactivated.

During catalyst reactivation, the temperature of the gas 42 rises due to the reduction. However, when catalyst reactivation has terminated, heat is no longer produced and the temperature of catalyst outlet falls as shown in FIG. 5. Therefore, when the outlet temperature of the catalysts 51, 52 has fallen below a second set temperature, it is determined that the catalysts 51, 52 have recovered from deterioration, supply of the gas 41 from the startup combustor 11 is stopped, steady-state operation started, and the reforming reaction is restarted (S306, 307).

Hence, by reactivating the catalyst repeatedly, a high catalyst activation state can be maintained for a long period, and the reforming reaction and CO removal reaction can be performed efficiently. Here, when the catalyst has reached a predetermined deteriorate condition, extraction of current from the fuel cell 16 is temporarily interrupted and catalyst reactivation is performed. But if the CO concentration in the gas 42 is low, catalyst reactivation and fuel cell operation may be performed parallel.

Next, a preferred modification will be described where this reforming reaction, CO removal reaction and reactivation are performed repeatedly.

Figure 6:
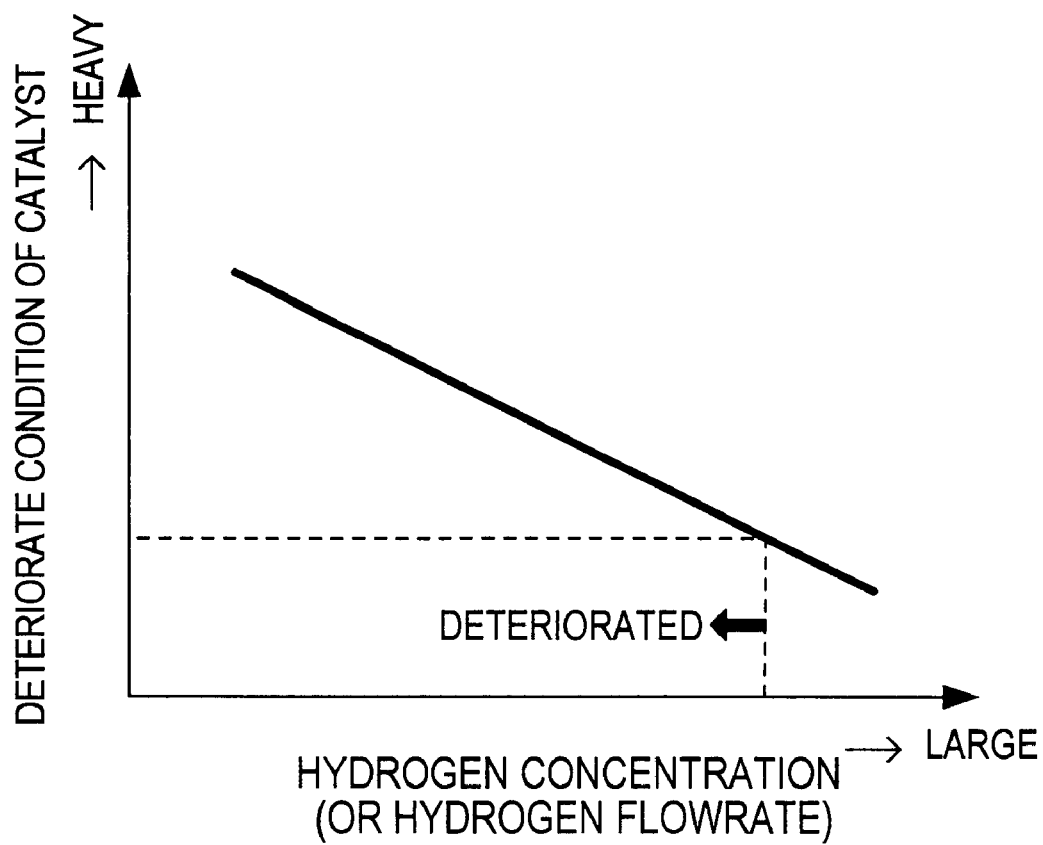
FIG. 6 is a diagram showing a relation between hydrogen concentration (or flowrate) and the deteriorate condition of catalyst.

First, in the above embodiment, the deteriorate condition of catalyst in the device is determined by detecting the outlet temperature of the catalysts 51, 52, but it may be determined by other methods. For example, when methanol is used as fuel, for sensors 71, 72 provided at the outlet of the catalysts 51, 52 to detect one or more of the temperature, CO concentration, methanol concentration, hydrogen concentration, $CO_2$ concentration, $H_2O$ concentration and gas flowrate, the deteriorate condition of catalyst may be determined based on these detection. When the sensors 71, 72 are detect of hydrogen concentration or flowrate, it may be known that the thing that catalyst has deteriorated from the decrease in the hydrogen concentration or flowrate as shown in FIG. 6.

Also, if the ratio of detection at the catalyst inlet and outlet is computed, and the deteriorate condition of catalyst determined based on this ratio, a more precise determination of deterioration can be performed. For example, it may be determined that catalyst has deteriorated hardly, the larger the ratio of the outlet temperature to the inlet temperature.

Also, if the deteriorated condition, where catalytic activity falls due to the reforming reaction over a long period and reactivation proves necessary, can be found experimentally beforehand, it can be taken as a permitted deterioration, the time required for the actual deterioration to reach the permitted deterioration may be predicted by a proportional computation based on a comparison of the deterioration actually detected with the permitted deterioration, and the reactivation starting time determined thereby.

The permitted deterioration may also be found by determining the CO concentration at the catalyst outlet. CO poisons the electrode catalyst at the fuel cell 16, and so the CO concentration of the catalyst 52 outlet must be suppressed as low as possible.

The permitted deterioration can also be determined by estimating the reforming rate, i.e., by estimating what percentage of methanol is reformed to hydrogen when the reforming reaction is performed. The reforming rate may be found also by measuring one of the hydrogen concentration, $CO_2$ concentration, methanol concentration, $H_2O$ concentration and gas flowrate at the outlet of catalyst 51, 52. Specifically, the reforming rate can simply be found from the relation between the reforming rate, the amount of methanol and water supply which are already known, and one or more of the hydrogen concentration, $CO_2$ concentration, methanol concentration, $H_2O$ concentration or gas flowrate which are measured beforehand. If all gas components are measured and the reforming rate is calculated, the permitted deterioration may be set by a more factual reforming condition.

Next, a second embodiment of this invention will be described referring to FIG. 7. Identical symbols are given to parts which are identical to those of FIG. 1.

The second embodiment differs from the first embodiment in that the gas 41 is supplied directly to the reformer 13 and CO removal device 15, bypasses 55, 56 are provided, and the reformate gas 42, 43 discharged from the reformer 13 and CO removal device 15 can be bypassed to the combustor 18 via bypasses 55, 56. In this embodiment, the gas flowrate is changed over according to the need for bypass, as described in detail below, using the valves 61, 62 and the valves 63, 64.

The startup operation of the drive system in this embodiment will be described referring to FIG. 8.

First, in order that the gases 42, 43 produced by the reduction of the reforming catalyst 51 and CO removal catalyst 52 due to the gas 41 do not affect the downstream CO removal device 15 and fuel cell 16, the valves 61, 63 are closed, and the valves 62, 64 are opened while the start-up combustor 11 is running (S501, S502). Thus, the reducing gas 42 from the reformer 13 on startup does not flow into the CO removal device 15, and the reducing gas 43 from the CO removal device 15 does not flow into the fuel cell 16, so adverse effects on the CO removal device 15 and fuel cell 16 are avoided.

Next, the gas 41 from the startup combustor 11 is supplied to the reformer 13 and CO removal device 15 (S503), the reforming catalyst 51 and CO removal catalyst 52 situated in the reformer 13 and CO removal device 15 are reduced, and the reformer 13 and CO removal device 15 are warmed up by the heat generated on the reduction (S504, S505). In the combustor 18, due to the heat of the combustion, a large amount of heat can be supplied to the vaporizer 17 in a short time, and the outlet temperature of the vaporizer 17 can be raised in a short time.

Subsequently, when the outlet temperature of the vaporizer 17 has been raised to the predetermined temperature, the fuel gas is supplied to the reformer 13 from the vaporizer 17, the air 31 is supplied to the reformer 13 via the first mixer 12, and the air 33 is supplied to the CO removal device 15 via the second mixer 14 (S506, S507). Next, the valves 61, 63 are opened, the valves 62, 64 are closed (S508), supply of fuel and air to the startup combustor 11 is stopped and there is a changeover to steady-state operation (S509, S510).

Next, another catalyst reactivation control will be described referring to FIG. 9. The construction of the fuel cell drive system is identical with that of the second embodiment.

Figure 8:
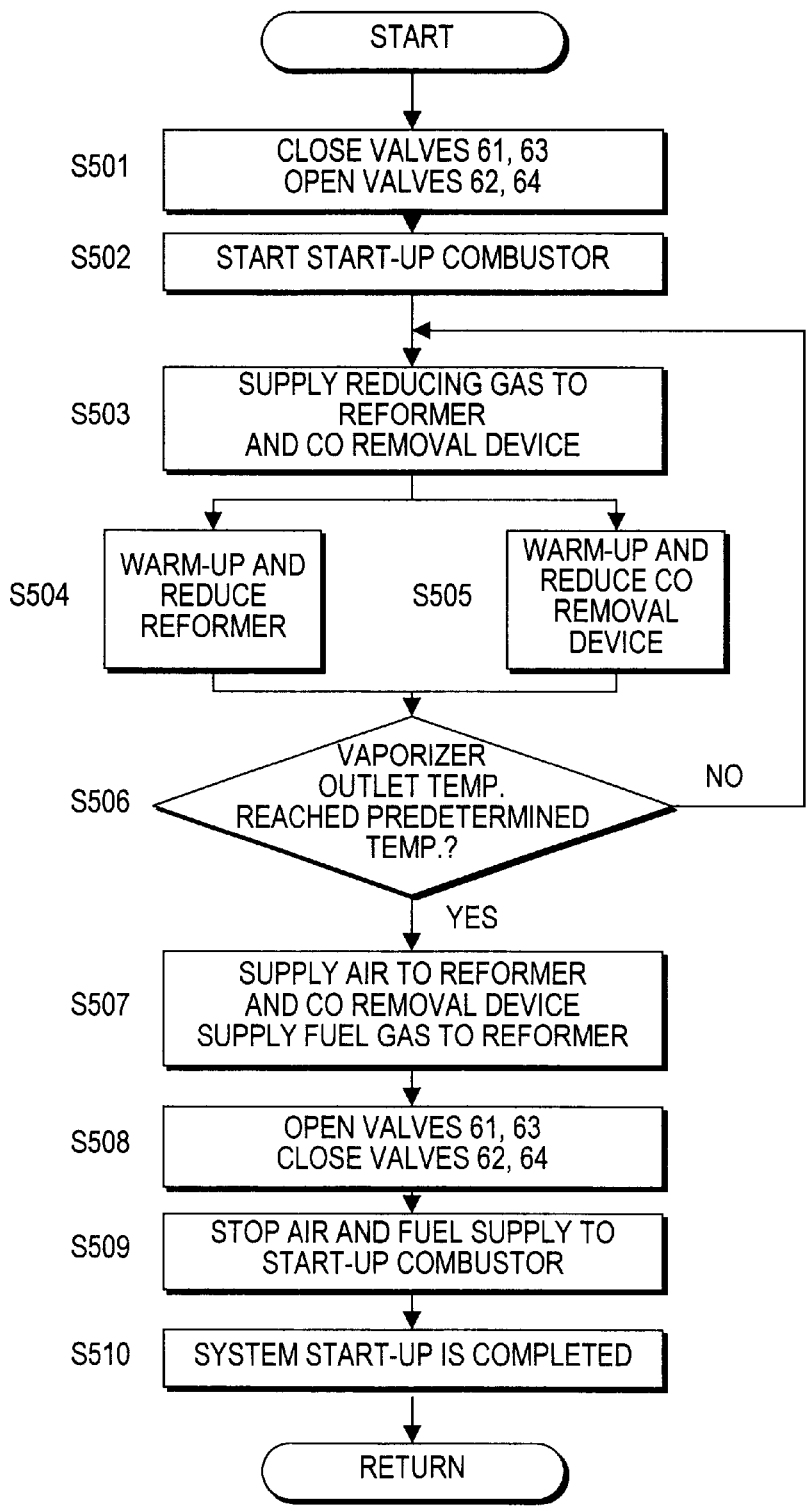
FIG. 8 is a flowchart showing the details of a drive system startup process according to the second embodiment.
Figure 9:
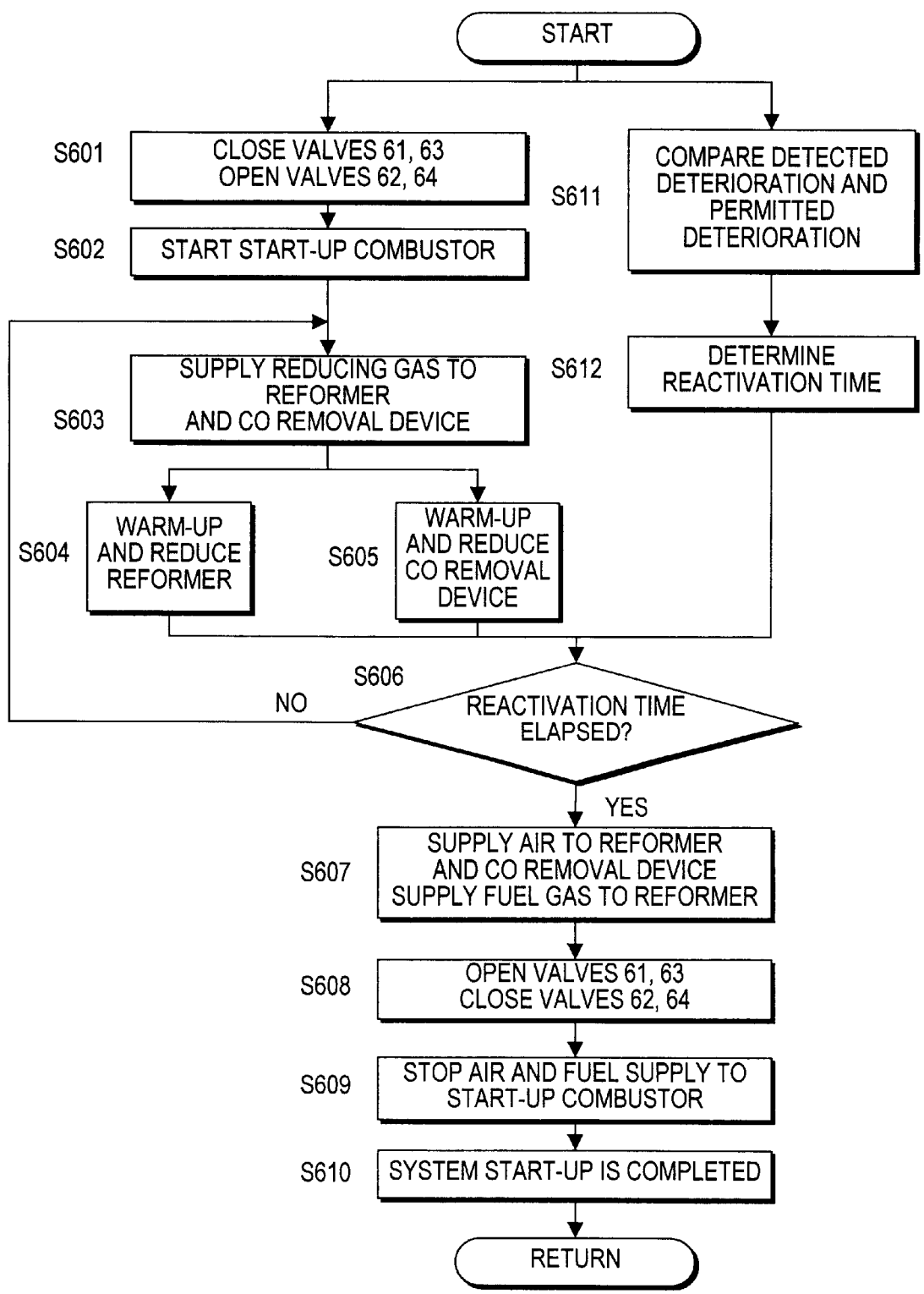
FIG. 9 is a flowchart showing the details of another example of the catalyst reactivation process.

The steps S601–S605 and S607–S610 of FIG. 9 are identical with the steps S501–S505 and S507–S510 of FIG. 8.

After the catalyst deterioration is detected, in the step S606, reactivation is performed until a reactivation time required for reactivation the catalysts 51, 52, preset according to the deteriorate condition, has elapsed. Specifically, the permitted deterioration preset by experiment or the like is compared with the detected deterioration, the reactivation time required for catalyst reduction is computed based on the ratio of them, and the time for supplying reducing gas is determined (S611, S612). The method of detecting the deterioration stated already can be used for detecting the catalyst deterioration.

The gas having a reducing action may be supplied not continuously but intermittently by selecting a time when the fuel cell is not generating much power such as, for example, during idle running, whence the total supply time becomes the above-mentioned reactivation time.

In the above embodiments, the fuel cell drive system used methanol as fuel, but this invention is not limited to this construction. For example, this invention is not limited to systems using methanol, and may be applied to cases where substances containing hydrocarbons such as gasoline are used as the fuel. When gaseous fuels are used, the vaporizer 17 is unnecessary, and this invention may be applied also to such a device. Further, in the above embodiments, the reformer 13 and CO removal device 15 both has catalysts, but this invention may be applied also to a drive system having a catalyst at least in one of the reformer 13 and CO removal device 15.

Further, in the above embodiments, the gas 41 was applied to both the reformer 13 and CO removal device 15, but the gas 41 may be supplied selectively to one of the reformer 13 and CO removal device 15.

In the above embodiments, the gas 41 for reducing the catalysts 51, 52 is produced in the startup combustor 11, but the gas having a reducing action may be produced also in an ordinary combustor. Alternatively, instead of a combustor, another device may be provided for producing the gas having a reducing action, and the gas having a reducing action supplied from this device.

In the same way as performing catalyst reactivation during running of the system, catalyst deterioration may be determined also during startup, whereupon startup can be determined to be complete when the catalyst has recovered to a predetermined deteriorate condition, and a change-over to steady-state operating then performed. When the catalyst is reactivated during startup and steady-state operating, reducing gas may be supplied at a fixed interval to perform catalyst reactivation. Further, if deterioration is determined and the catalyst is found to be deteriorated, gas having a reducing action can be constantly supplied during idle running.

Figure 10:
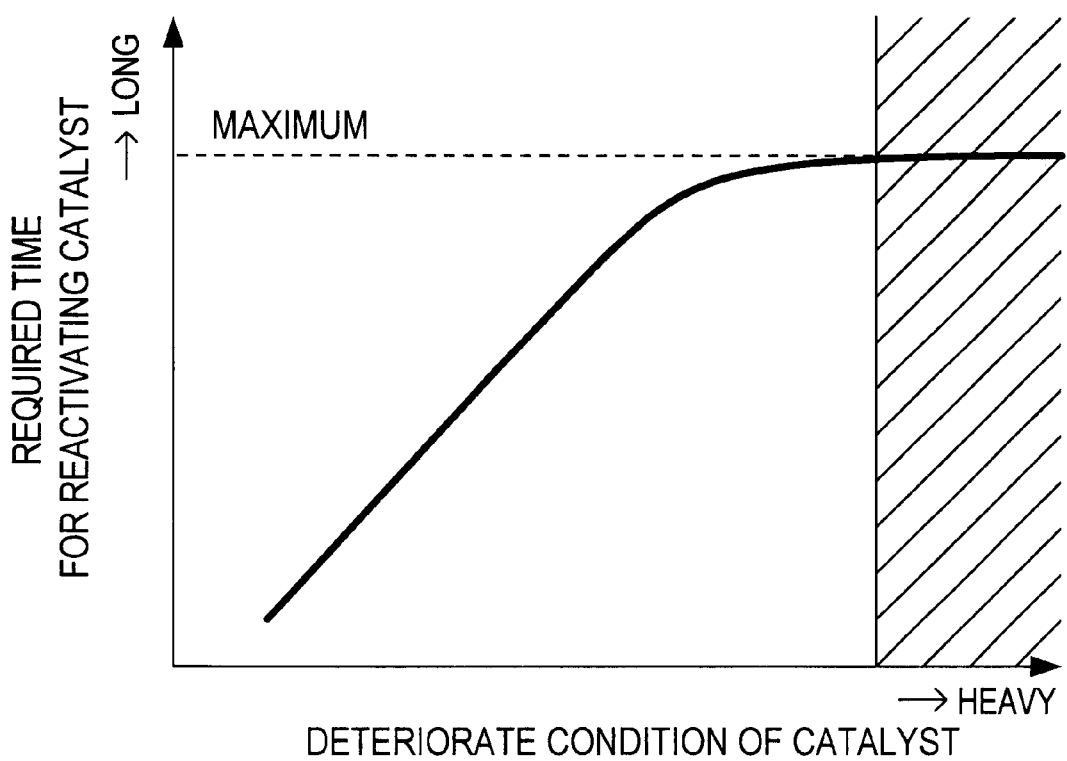
FIG. 10 is a diagram showing a relation between the time required for catalyst reactivation and the deteriorate condition of catalyst.

If the catalyst is severely oxidized due to long periods of non-use, first use after replacement or regular maintenance, the time required for reactivation increases to be a maximum as shown in FIG. 10, so reduction may be performed for a predetermined time required for reactivation immediately after startup. In this case, the time from stopping to restarting of the fuel cell for example can be integrated by a timer of the like, and it may be determined whether the catalyst has not been used for a long period based on this integral value. Further, next catalyst replacement may be determined by providing a sensor which detects when the catalyst is replaced.

The deteriorate condition of catalyst when the system has stopped running may be stored in the memory of the controller 90, and reduction may be performed according to the stored deteriorate condition when the system is restarted. Alternatively, gas having a reducing action can be produced not in the start-up combustor but in a combustor using when steady-state operation, and this gas used for catalyst reduction.

Figure 7:
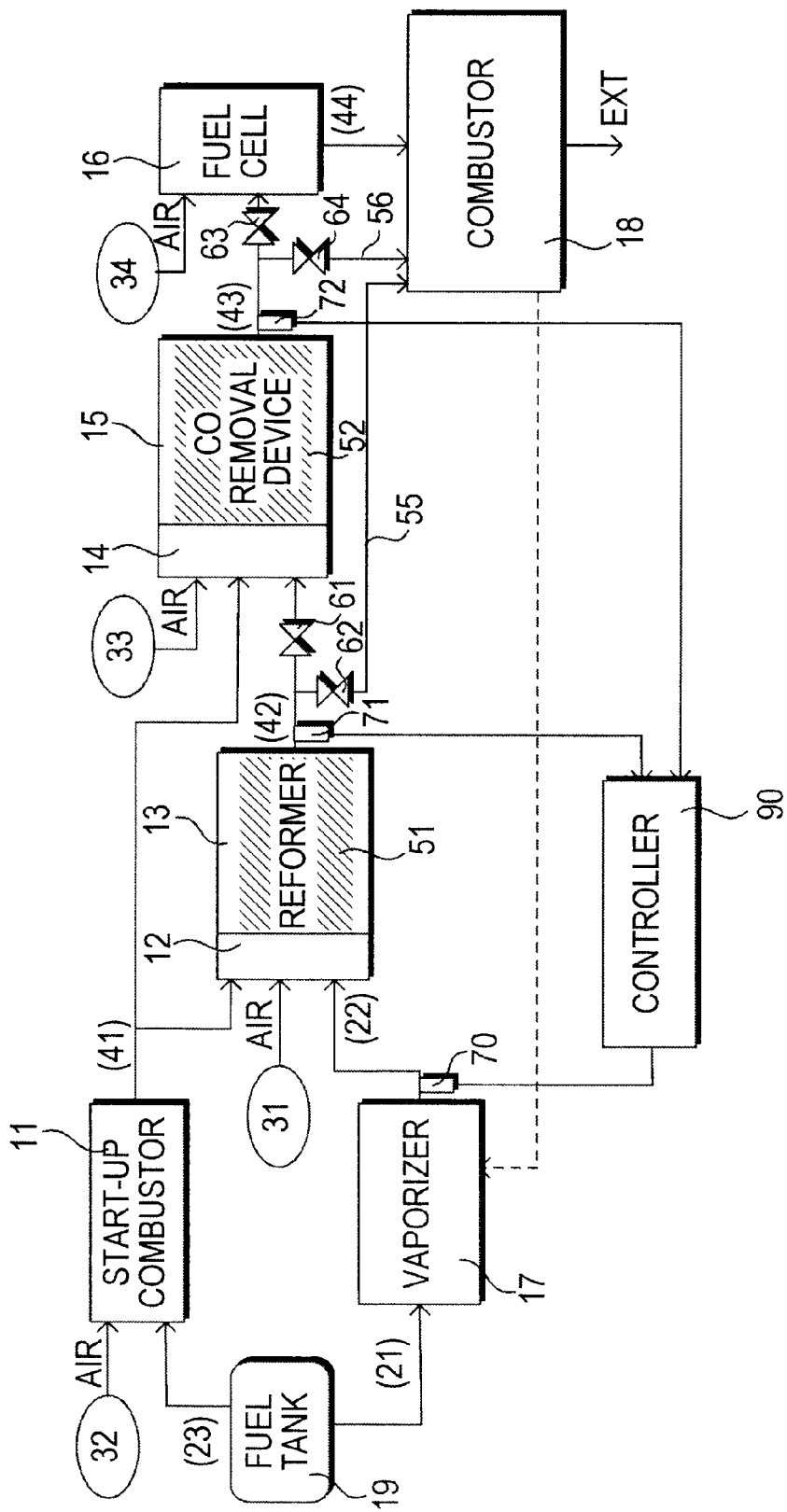
FIG. 7 is similar to FIG. 1, but showing the construction of a second embodiment of this invention.

In the second embodiment shown in FIG. 7, both the CO removal device 15 and fuel cell 16 were bypassed, but only one of these devices may be bypassed. Further, the bypassed discharge gas may be purified by a device other than the combustor 18.

The entire contents of Japanese Patent Application P2000-312082 (filed Oct. 12, 2000) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A drive system for a fuel cell, comprising:
   a catalyst reaction part which has a catalyst and generates gas supplied to the fuel cell by a catalytic reaction in the catalyst;
   a start-up combustor which is provided upstream of the catalyst reaction part and receives a supply of fuel and air to perform combustion; and
   a controller functioning to:
      generate high temperature reducing gas in the start-up combustor by burning the supplied fuel and air, and
      supply the high temperature reducing gas to the catalyst reaction part, and reduce the catalyst in the catalyst reaction part.

2. The drive system as defined in claim 1, wherein:
   the catalyst reaction part comprises at least one of a fuel reformer and a CO removal device.

3. The drive system as defined in claim 1, comprising:
   a bypass which bypasses the device situated downstream of the catalyst reaction part, and
   the controller further functions to introduce gas after reduction to the bypass when the catalyst is reduced by the high temperature reducing gas.

4. The drive system as defined in claim 3, comprising:
   a combustor which burns gas from the bypass.

5. The drive system as defined in claim 1, wherein:
   the controller further functions to:
      determine deterioration of the catalyst in the catalyst reaction part, and
      supply the high temperature reducing gas to the catalyst reaction part when the catalyst has deteriorated.

6. The drive system as defined in claim 5, wherein:
   the controller further functions to:
      supply the high temperature reducing gas until it is determined that the catalyst deterioration has recovered to a second deteriorate condition less than a first deteriorate condition when it is determined that the deterioration of the catalyst has reached the first deteriorate condition.

7. The drive system as defined in claim 5, wherein:
   the controller further functions to:
      supply the high temperature reducing gas to the catalyst reaction part during a required reactivation time determined according to the deteriorate condition of the catalyst when it is determined that the deterioration of the catalyst has reached a first deteriorate condition.

8. The drive system as defined in claim 5, wherein:
   the controller further functions to:
      store a required reactivation time according to the deteriorate condition of the catalyst when the drive system has stopped, and
      supply the high temperature reducing gas to the catalyst reaction part during the stored reactivation time when the drive system starts on the next occasion.

9. The drive system as defined in claim 1, wherein, when the catalyst of the catalyst reaction part has not been used for a long period, when it is initially used or when it is severely oxidized,
   the controller further functions to supply high temperature reducing gas to the catalyst reaction part during a predetermined time when the drive system starts.

10. The drive system as defined in claim 5, comprising:
    a sensor which detects one of the temperature, gas composition and gas flowrate at the outlet of the catalyst, and the controller further functions to:
    determine the catalyst deterioration based on the detection amount at the outlet of the catalyst.

11. The drive system as defined in claim 5, comprising:
    sensors which detect one of the temperature, gas composition and gas flowrate at the inlet and outlet of the catalyst, and the controller further functions to:
       determine the catalyst deterioration from the ratio of the detection amounts at the inlet and outlet of the catalyst.

12. A drive system for a fuel cell, comprising:
    a catalyst reaction part which has a catalyst and generates gas supplied to the fuel cell by a catalytic reaction in the catalyst;
    a start-up combustor which is provided upstream of the catalyst reaction part and receives a supply of fuel and air to perform combustion;
    means for generate high temperature reducing gas in the start-up combustor by burning the supplied fuel and air; and
    means for supplying the high temperature reducing gas to the catalyst reaction part, and reduce the catalyst in the catalyst reaction part.

* * * * *